G. F. POWELL.
AIR VALVE.
APPLICATION FILED MAR. 27, 1920.

1,370,483.

Patented Mar. 1, 1921.

Inventor.
George F. Powell
by H. J. S. Dennison
atty.

UNITED STATES PATENT OFFICE.

GEORGE FREDERICK POWELL, OF TORONTO, ONTARIO, CANADA.

AIR-VALVE.

1,370,483.  Specification of Letters Patent.  Patented Mar. 1, 1921.

Application filed March 27, 1920. Serial No. 369,235.

*To all whom it may concern:*

Be it known that I, GEORGE FREDERICK POWELL, a subject of the King of Great Britain, and resident of the city of Toronto, county of York, Province of Ontario, in the Dominion of Canada, have invented certain new and useful Improvements in Air-Valves, described in the following specification and illustrated in the accompanying drawings, that form part of the same.

The principal objects of this invention are to produce an air valve for use in pneumatic tires and the like, which will effectively retain the air without leakage and will not be liable to get out of order.

A further and very important object is to greatly simplify the structure of the valve, eliminating a multiplicity of small parts and also doing away with the use of rubber washers and gaskets, thereby obviating complications both in manufacture and use and producing a valve which may be manufactured at extremely low cost.

The principal feature of the invention consists in the novel construction and arrangement of parts whereby the air passages leading into the valve are sealed on their inward side by a piston-shaped valve member and whereby the outer end of the valve is effectively closed.

In the accompanying drawings, Figure 1 is an enlarged vertical sectional view, showing the valve with the parts in the closed position, and the cap arranged thereon.

Figure 1:
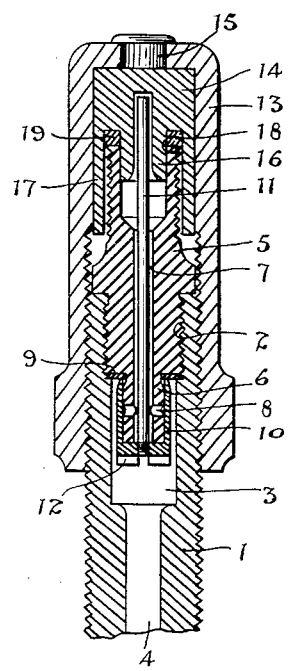
Figure 2:
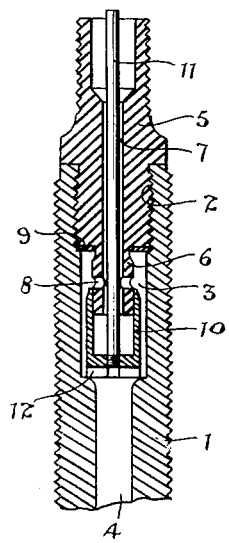
Fig. 2 is a vertical sectional view showing the valve cap removed and the valve in the open position admitting air through the valve.
Figure 3:
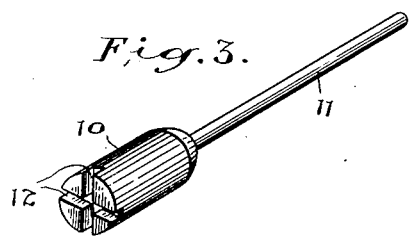
Fig. 3 is a perspective detail of the valve piston.

A great many different forms of air valves for pneumatic tires have been devised, but it is well known that one type of valve has become almost universal and this type of valve depends upon very delicate parts for maintaining its useful closure. These delicate parts are complicated and involve a great deal of handling in manufacture and easily get out of order.

It is proposed to utilize the air pressure within the tire to better advantage than it has hitherto been used to maintain an air tight joint in the valve. To accomplish this, I have devised a structure in which the valve body 1 is formed with a threaded orifice 2 at the inner end of which is arranged a cylindrical chamber 3 leading to the central air passage 4. A metal plug 5 is threaded into the orifice 2 and is formed with a cylindrical extension 6 the inner end of which projects into the chamber 3.

A central orifice 7 extends downwardly through the plug 5 and a cross hole 8 is bored through the extension 6 intermediate of its length. The upper end of the portion 6 is slightly recessed to hold a leather gasket 9. The valve is a piston-shaped member 10, having its inner diameter a sliding fit over the cylindrical surface of the member 6 and its outer diameter smaller than the chamber 3. The upper end of the valve is slightly beveled so that it will seat into the gasket 9 and form an air-tight joint.

The side walls of the valve 10 cover the holes 8 and an air-tight joint between the walls of the valve and the central cylindrical portion may be maintained by a thin film of oil, as there are no rubber parts in the valve to be deteriorated by the use of a slight quantity of oil.

The valve 10 is provided with a central stem 11 which is preferably threaded into the bottom end and extends upwardly through the opening 7. This stem is provided so that the valve may be opened to release the air from within when desired. The bottom end of the valve 10 is formed with transverse slots 12 through which the air flows to and from the passage 4.

It is very important to note that in the construction herein shown and described, the cylindrical shaped valve in the form of a piston, is arranged outside of the cylindrical member upon which it slides. The piston is therefore comparatively large and may be made with greater accuracy and further, it presents a large end surface area against which the pressure within the tire acts to close it. Further, its position exterior to the central supporting portion enables the seal to be very effective, as the primary seal of the edge against the gasket is on the pressure side and the cylindrical surface of the piston being a snug fit upon the supporting cylindrical member, forms an effective seal to any slight leakage which might get past the outer gasket.

The valve cap here shown is also of a very simple construction, comprising the outer cap 13 which is threaded on the outer side of the valve 1, and an inner cap 14 which is rotatably secured to the cap 13 by a central stud 15. The inner cap is provided with an inner cylindrical flange 16 which enters the top of the valve and an outer cylindrical flange 17 which extends outside the threaded portion forming a groove 18. The upper end of the valve plug 5 extends into the groove 18 and seats against a gasket 19. When the cap is screwed down the inner rotatable cap engages the valve top and is pressed tightly into place without rotation, thus eliminating any grinding effect upon the gasket.

In the operation of the valve, when air is introduced into the top it flows through the orifice 7 and moves the piston valve down until the side wall uncovers the cross hole 8. The air then flows around the outside of the valve and into the tire. When the inward pressure is released the outward pressure against the end of the piston valve moves it quickly to close the hole 8 and the upper edge seats against the gasket and holds it securely. No spring is needed to seat the valve. The center stem enables the opening of the valve to let the air out of the tire if desired.

What I claim as my invention is:—

1. In an air valve, the combination with the body, of a plug closing the top of said body and having a central opening therethrough and formed with a cylindrical extension having lateral openings communicating with the central opening, a gasket surrounding the upper end of said cylindrical extension, and a cylindrical valve closed at the bottom and encircling said extension and adapted to close the lateral openings and adapted to seat against said gasket when moved above said lateral openings.

2. In an air valve, the combination with the body having an internally threaded portion and a cylindrical chamber below said threaded portion leading to a central passage extending through the body, of a plug threaded into said body and having a central opening therethrough and a reduced cylindrical portion extending into said cylindrical chamber and spaced from the walls thereof; lateral passages in said reduced cylindrical portion arranged intermediate of its length, a cylindrical valve closed at the lower end and slidably fitting the reduced cylindrical portion and spaced from the inner wall of the cylindrical chamber in the valve body, said valve being adapted to extend above the lateral openings in the plug and to be moved below the same to allow ingress and egress of the air, and passages arranged under the head of the valve to permit the passage of air therearound when the valve is depressed.

GEORGE FREDERICK POWELL.